United States Patent
Grünaug et al.

(10) Patent No.: US 7,213,565 B2
(45) Date of Patent: May 8, 2007

(54) METHOD FOR OPTIMIZING THE OPERATING MODE AND COMBUSTION PROCESSES OF A DIESEL ENGINE

(75) Inventors: Peter Grünaug, Friedberg (DE); Stephan Haas, Mammendorf (DE); Günter Heider, Grossaitlingen (DE)

(73) Assignee: MAN B&W Diesel Aktiengesellschaft, Augsburg (DE)

( * ) Notice: Subject to any disclaimer, the term of this patent is extended or adjusted under 35 U.S.C. 154(b) by 0 days.

(21) Appl. No.: 10/546,879

(22) PCT Filed: Feb. 21, 2004

(86) PCT No.: PCT/EP2004/001722

§ 371 (c)(1),
(2), (4) Date: Nov. 20, 2005

(87) PCT Pub. No.: WO2004/076840

PCT Pub. Date: Sep. 10, 2004

(65) Prior Publication Data

US 2006/0107921 A1 May 25, 2006

(30) Foreign Application Priority Data

Feb. 28, 2003 (DE) .................. 103 08 789

(51) Int. Cl.
*F02B 3/00* (2006.01)
*F02B 5/00* (2006.01)
(52) U.S. Cl. .................. 123/299; 123/305
(58) Field of Classification Search .......... 123/294, 123/299, 304, 305, 429, 432
See application file for complete search history.

(56) References Cited

U.S. PATENT DOCUMENTS

| 4,284,043 A * | 8/1981 | Happel .................. 123/299 |
| 6,073,608 A * | 6/2000 | Krieger et al. .............. 123/299 |
| 6,343,585 B1 | 2/2002 | Fujieda et al. |
| 6,712,036 B1 * | 3/2004 | Andersson et al. ......... 123/299 |
| 6,848,414 B2 * | 2/2005 | West et al. .................. 123/299 |
| 2002/0195081 A1 * | 12/2002 | McGee et al. .............. 123/299 |
| 2003/0213463 A1 * | 11/2003 | Coleman et al. ............ 123/305 |
| 2004/0025849 A1 * | 2/2004 | West et al. .................. 123/480 |

(Continued)

FOREIGN PATENT DOCUMENTS

DE         44 39 573 A1      5/1996

(Continued)

*Primary Examiner*—John T. Kwon
(74) *Attorney, Agent, or Firm*—Cohen Pontani Lieberman & Pavane LLP

(57) ABSTRACT

A method for optimizing the operating and combustion processes of a diesel engine with common rail injection and a turbocharger includes injecting fuel into each combustion chamber of the diesel engine by a main injection and a post-injection which follows the main injection and controlling a start time and a quantity of the post-injection as a function of an end of the main injection and as a function of operating parameters of the diesel engine using an electronic engine control unit and an input-output map stored in the electronic engine control unit. The post-injection is initiated at a point 30–180° of rotation of a crankshaft of the diesel engine after the end of the main injection, and the quantity of the post-injection is adjusted to 20–30% of a quantity of the main injection.

6 Claims, 2 Drawing Sheets

U.S. PATENT DOCUMENTS

2005/0224044 A1* 10/2005 Stojkovic et al. ............ 123/299
2005/0268884 A1* 12/2005 Yokoyama .................. 123/299

FOREIGN PATENT DOCUMENTS

| DE | 197 47 231 | 4/1999 |
| DE | 198 36 053 | 2/2000 |
| DE | 199 44 190 | 3/2001 |
| DE | 102 17 238 | 11/2003 |
| EP | 1 001 153 A1 | 5/2000 |
| EP | 1 211 404 A1 | 6/2002 |
| EP | 1 245 817 A2 | 10/2002 |

* cited by examiner

METHOD FOR OPTIMIZING THE OPERATING MODE AND COMBUSTION PROCESSES OF A DIESEL ENGINE

PRIORITY CLAIM

This is a U.S. national stage of application No. PCT/EP2004/001722, filed on 21 Feb. 2004. Priority is claimed on the following application: Country: Germany, Application No.: 103 08 789.3, Filed: 28 Feb. 2003.

BACKGROUND OF THE INVENTION

The invention pertains to a method for optimizing the operating and combustion processes of a diesel engine with common rail injection with the goal of minimizing pollutant emissions in which fuel is injected into each combustion chamber of the diesel engine by at least a main injection and a post-injection following the main injection.

Against the background of increasingly stringent emission standards (TA Luft=Technical Committee on Air), especially for stationary installations, power plants, pumping stations, and compressor installations, the lowering of pollutant values for nitrogen oxides is receiving more and more emphasis in engine development.

For example, DE 198 36 053 A1 describes a system for the automatic control and regulation of fuel injection that comprises a common rail injection system, in which the injection process is optimized to minimize pollutant emissions by dividing it into a preinjection, a main injection, and a postinjection phase. In this regard, the postinjection phase in particular makes significant exhaust gas improvement possible. The postinjection quantity is supplied by injectors after the combustion of the main injection quantity and is essentially discharged with the exhaust gas and reacts in an additional catalytic converter together with the nitrogen oxide to form harmless components.

As is well known, in electronically controlled injection systems for diesel engines, e.g., in the common rail injection system, which can provide a freely selectable injection pressure at all engine operating points, the fuel injection is controlled by a solenoid valve or piezoelectric valve. The solenoid valve is actuated by an electronic control unit, which is often referred to as the ECU (engine control unit), in such a way that the time at which the injection starts, the duration of the injection, and the quantity injected can be derived as a function of the operating parameters of the engine from an input-output map, which is stored in the ECU and is determined, for example, by an optimization method.

Thus, strategies for configuring the course of the injection process involving the use, for example, of memory-based injection systems to adapt the injection pressure and the actuation start time for each point in the engine speed-versus-load input-output map, as described by way of example in U.S. Pat. No. 6,073,608, were already regarded in the prior art as suitable means of optimization.

When an exhaust gas turbocharger is incorporated into the operating and combustion processes of the diesel engine, exhaust gas recycling is especially important as an effective means of reducing $NO_x$ levels on the air side of the diesel engine process. On the fuel side, as described above, common rail injection is an effective optimization technique. Because of the flexibility thus obtained with respect to providing the most suitable injection rate and mixing intensity at each moment in time, this optimization is possible basically for any combination of engine speed and engine load.

In addition to the goal of reducing $NO_x$ emissions, there is also the need in diesel engines with exhaust gas turbocharging to increase the charging air pressure inside the engine so that $NO_x$ emissions can be reduced on the air side. The previously known methods offer no suggestions on how to accomplish this.

According to the state of the art, the term "postinjection" means that a main injection, constituting about 90% of the amount to be injected, is followed by a smaller, secondary injection (which in the prior art is intended to occur in the subsiding phase of the combustion process). This makes it possible to reduce the emission of a pollutant ($NO_x$ or soot) or to decrease fuel consumption without changing any of the other values. The interval between the main injection and the postinjection can be varied within certain limits. If the interval is too short, however, the results are not reproducible. Conversely, if the interval is too long, the soot values in particular become worse, since the post-injected amount itself forms soot. Tests have shown that the injection of a small quantity (>10% of the main injection quantity) immediately following the main injection (about 5–15° crankshaft after the end of the main injection) gives good results in the upper load range, especially in the case of supercharged diesel engines.

Thus, the strategy of multiple injections (especially the use of postinjections) has been used until now to reduce pollutant emissions internally in the engine. Moreover, it is known that eliminating the preinjection can also lead to an improvement of pollutant emissions, especially $NO_x$ emissions.

SUMMARY OF THE INVENTION

An object of the present invention is to elaborate the process of optimizing the operating and combustion processes of a diesel engine to minimize pollutant emissions in conjunction with the use of common rail injection and an exhaust gas turbocharger in such a way that the enthalpy of the exhaust gas can be temporarily increased internally in the engine by configuring the course of the injection process, with the result that the power output at the exhaust gas turbine is increased and, as a result of the mechanical coupling between the turbine and the compressor, the air mass flow and the charging air pressure on the compressor side can also be increased.

This is desirable especially when, e.g., the load increases and the soot emissions rise as a result of a lack of air.

The object is achieved by a method in which fuel is injected into each combustion chamber of the diesel engine by a main injection (MI) and a post injection "boost injection", i.e., the injection of fuel into the combustion chambers of the engine after the main injection required for the load point has already occurred, wherein the boost injection is initiated at a point 30–180° angular movement of the crankshaft after the end of the main injection, and the quantity of the boost injection is 20–30% of the main injection quantity.

It is a particular advantage that the inventive "boost injection" can simply replace auxiliary units for dynamic engine operation such as the "jet assist", i.e., an auxiliary unit for accelerating the exhaust gas turbocharger (to inject more air when the load increases), since increasing the charging air pressure and the compressor mass flow is precisely what will be achieved inside the engine by the inventive process.

Furthermore, it is also advantageous to use "boost injection" at those load points in the engine input-output map at which it is known from experience that the exhaust gas turbocharger and the diesel engine are not working optimally together and in cases where fuel consumption is not a major concern at the same time. In this load range, a lack of coordination of this type can be corrected by "boost injection".

DETAILED DESCRIPTION OF THE PREFERRED EMBODIMENTS

Figure 1:
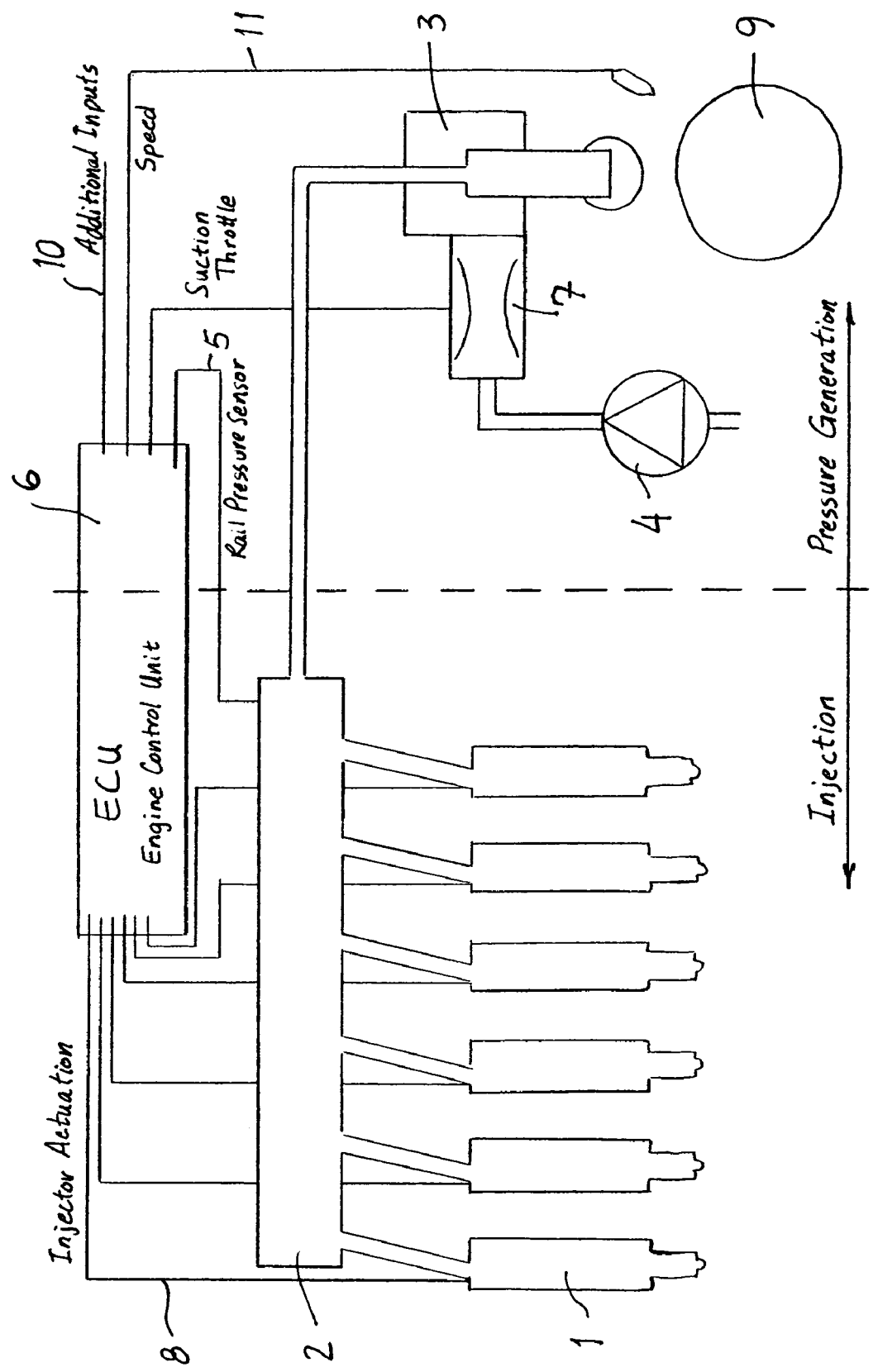
FIG. 1 is a schematic diagram of the fuel metering system to be used by the present invention.

In a multicylinder diesel engine with turbocharging, fuel metering is controlled by an electronic valve or by a solenoid valve. The common rail injection system illustrated in FIG. 1 shows that an injector 1 is assigned to each cylinder (here a six-cylinder engine) of the internal combustion engine. The injectors 1 meter fuel to the internal combustion engine as a function of the actuation 8 of the solenoid valves. The injectors 1 are hydraulically connected in the known manner to a high-pressure fuel accumulator (rail) 2, which is supplied with fuel from a fuel storage tank 4 by a high-pressure pump 3 (controlled here by a camshaft 9). If at all possible, the high-pressure pump 3 supplies the high-pressure fuel accumulator 2 only with the amount of fuel that will then be removed by the injectors 1.

To this end, the amount of fuel delivered by the high-pressure pump 3 can be controlled as a function of the pressure in the high-pressure fuel accumulator 2. To detect the pressure, a pressure sensor 5 is provided, whose output values are supplied to an engine control unit (ECU) 6. The ECU 6 evaluates the pressure sensor signal, compares it with a preassigned set point, which is stored in an input-output map, and uses the deviation from the set point to control the amount of fuel delivered under high pressure by the high-pressure pump. This control can be effected, e.g., by the adjustment of a throttling device 7 in the feed line of the high-pressure pump 3.

An input-output map is also used to store operating parameters of the internal combustion engine that are crucial for determining the amount of fuel to be injected and the time at which it is to be injected. Essentially, the injection time is maintained at an optimized value, which is stored in the input-output map. The injection quantity and the start of a postinjection, i.e., the "boost injection", are also determined in this input-output map as a function of load, i.e., as a function of the main injection quantity, of the charging air pressure, or of the turbocharger speed (see additional inputs 10, 11 of the ECU).

The injectors 1 are activated by energizing 8 the coils of the corresponding solenoid valves. The actuation signals for the coils thus determine the start of injection and the end of injection of the fuel by the injectors, and both injection quantities, i.e., the main injection quantity and the "boost injection" quantity, are metered to the combustion chamber of a given cylinder by the same electrically controlled injector 1.

Figure 2:
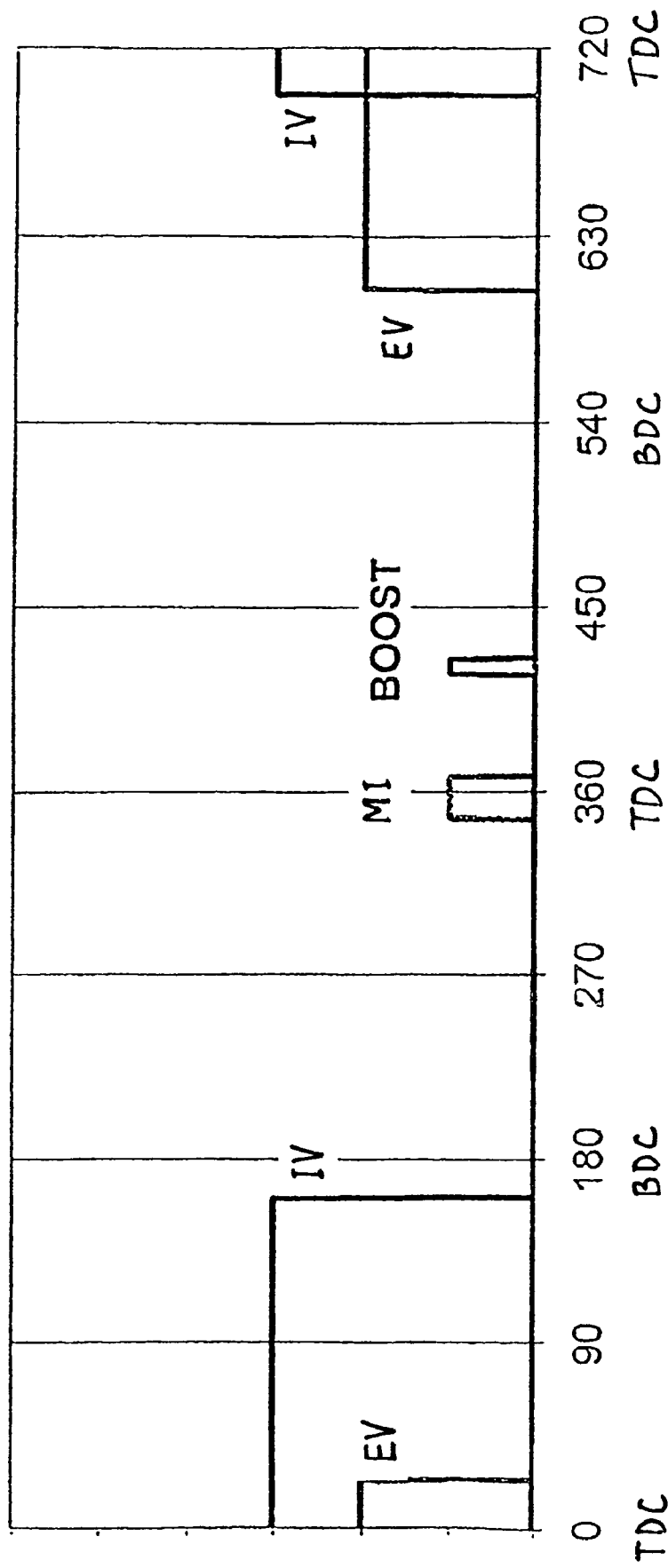
FIG. 2 is a graph of the postinjection phase as a function of the crankshaft angle.

In FIG. 2, various parameters such as the intake valve and exhaust valve opening times, the main injection MI, and the "boost injection" BOOST are plotted as a function of the angular position of the engine crankshaft (°crankshaft). TDC denotes the top dead centers of a cylinder. The individual top dead centers TDC of a cylinder are 360° apart. The periods of time during which the main injection MI and a postinjection BOOST into the individual cylinders occur and the exhaust valve opening times EV and the intake valve opening times IV are also indicated.

The main injection MI of the supercharged diesel engine into one of the cylinders occurs in the vicinity of the top dead center TDC at 360° crankshaft. The MI starts about 20° before TDC and has a duration of about 30–40°, i.e., it ends about 10–20° after TDC.

So that the postinjection BOOST will also have a positive effect on the exhaust gas emissions as well, the "boost injection" should occur during a specific period of time, to which an angular position of the crankshaft (°crankshaft) can be assigned (see FIG. 2).

In contrast to the previously known type of postinjection, in which a certain amount (about 10% of the main injection quantity) is injected shortly after the main injection (about 5–15° after the main injection), in "boost injection", the fuel is injected much later, namely, 30–180°, and preferably about 50°, after the end of the main injection. In the example shown, it is injected at about 400–550°, and preferably at about 420°. Furthermore, in "boost injection", a significantly larger amount of fuel is injected (about 20–30% of the main injection quantity), where the required amount generally determines how long the injection will take or vice versa.

The farther the "boost injection" BOOST from the main injection MI, the greater the postinjection quantity (20–30% of the main injection quantity) and the more the postinjected quantity is converted to heat and thus mechanical power, although this relationship is limited by the requirement for $NO_x$ and soot reduction. The smaller the postinjection quantity, the closer in time it can be moved towards the main injection MI.

For dynamic load applications, e.g., in the case of offshore ships which are held automatically in position during storms, especially those with GPS control, "boost injection" is initiated by the ECU according to the input-output map to avoid soot emissions.

An input-output map is thus stored in the ECU, in which, precisely in the case of rapid load application as well as in other situations, as previously described, the injection quantity and the start of the "boost injection" can be initiated as a function of load, i.e., as a function of the main injection quantity, charging air pressure, or the turbocharger speed.

The ECU detects a load application on the basis of an increase in the injection quantity over a certain period of time and implements the "boost injection" process either for a predetermined period of time or until a certain increase in the turbocharger speed or in the charging air pressure has occurred.

The duration of the so-called boost injection phase depends on the injection quantity that is required.

What is claimed is:

1. A method for optimizing the operating and combustion processes of a diesel engine with common rail injection and a turbocharger, comprising the steps of:
    injecting fuel into each combustion chamber of the diesel engine at least by a main injection and a post-injection which follows the main injection; and
    controlling a start time and a quantity of the post-injection as a function of an end of the main injection and as a function of operating parameters of the diesel engine using an electronic engine control unit and an input-output map stored in the electronic engine control unit, wherein said step of controlling comprises initiating the post-injection at a point 30–180° of rotation of a crankshaft of the diesel engine after the end of the main injection, and adjusting the quantity of the post-injection to 20–30% of a quantity of the main injection.

2. The method of claim 1, wherein the post-injection is initiated at a point about 50° of rotation of the crankshaft after the end of the main injection.

3. The method of claim 1, wherein the input-output map determines the start time of the post-injection at least as a function of the main injection quantity and one of a charging air pressure or a turbocharger speed.

4. The method of claim 1, wherein a duration of the post-injection is controlled by the engine control unit.

5. The method of claim 1, wherein the post-injection is controlled in response to an increase in one of a turbocharger speed or a charging air pressure.

6. The method of claim 5, wherein, in a dynamic load application, the post-injection is initiated according to the input-output map such that soot formation is avoided.

* * * * *

UNITED STATES PATENT AND TRADEMARK OFFICE
CERTIFICATE OF CORRECTION

PATENT NO.         : 7,213,565 B2
APPLICATION NO. : 10/546879
DATED              : May 8, 2007
INVENTOR(S)        : Peter Grünaug Page 1 of 1

It is certified that error appears in the above-identified patent and that said Letters Patent is hereby corrected as shown below:

Title Page
Please replace § 371(c)(1), (2), (4) Date as follows:

[86]   PCT No.:      PCT/EP2004/001722

§ 371 (c)(1),
       (2), (4) Date:   10/11/05

Signed and Sealed this

Twenty-fourth Day of July, 2007

JON W. DUDAS
*Director of the United States Patent and Trademark Office*